Aug. 11, 1964  P. HAHN  3,144,101
INERTIA TRAILER BRAKE ACTUATOR
Filed March 7, 1961
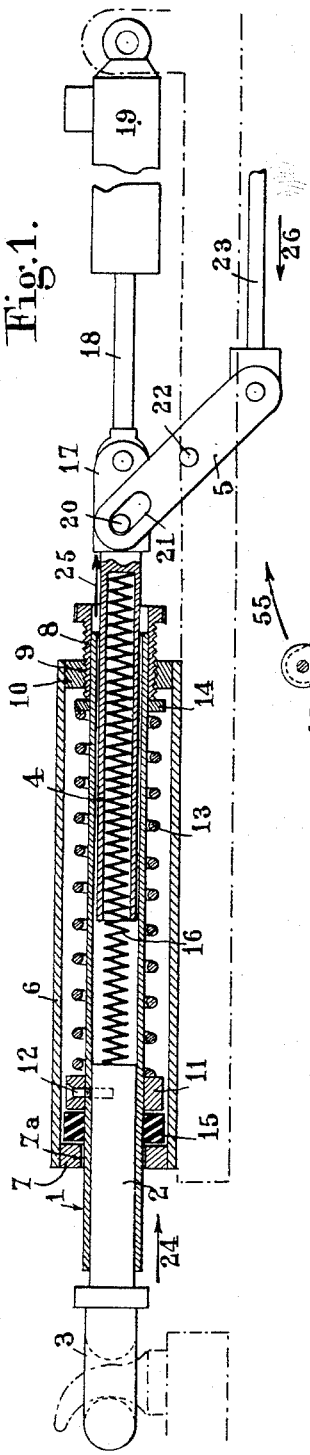
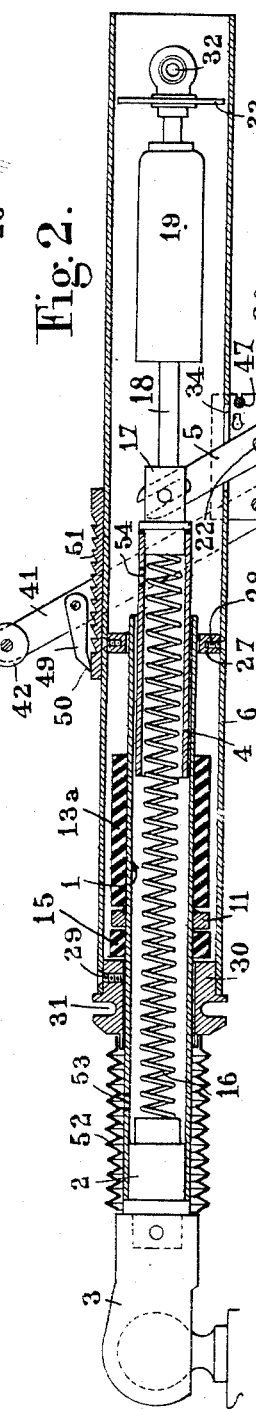
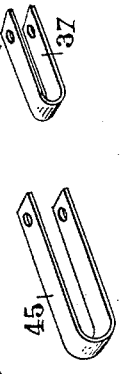
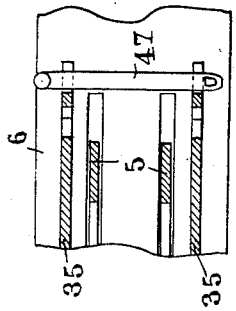
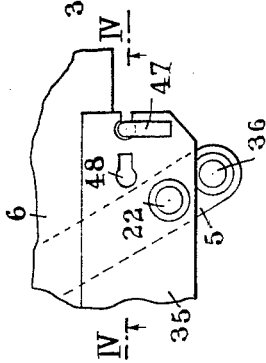

United States Patent Office 3,144,101
Patented Aug. 11, 1964

3,144,101
INERTIA TRAILER BRAKE ACTUATOR
Pierre Hahn, Paris, France, assignor to Le Rapide, Societe a Responsabilite Limitee, Rheims, France
Filed Mar. 7, 1961, Ser. No. 94,017
Claims priority, application France Mar. 9, 1960
7 Claims. (Cl. 188—112)

This invention relates generally to inertia braking systems and more particularly to an inertia brake adjuster.

A principal object of the present invention is to reduce the force of brake applications in vehicles, in order to avoid excessive locking of the wheels and reduce the wear and tear of the braking system component elements. The invention is applicable to the regulation of self-adjustment of any inertia braking system in both automotive vehicles and in their trailers.

Hitherto known inertia braking systems for trailers are interesting due to their low cost and their absence of undue complications, in comparison with continuous braking systems, but nevertheless they are attended by many drawbacks.

As a matter of fact, when the brakes of the tractor or like towing vehicle are applied, the brakes of the trailer are also applied as a consequence of its inertia, this braking effect being followed firstly by the brake release in the trailer if its deceleration is greater than that of the tractor vehicle, and then by another brake application in the trailer, by inertia, and so forth.

In braking systems of this character the action of the trailer brakes is limited by a damping spring in order to avoid successive useless brake applications, notably those resulting from gear changes in the tractor vehicle. Therefore, tractor decelerations of the order of 6 to 10 feet/second per second involve only an insignificant braking action from the trailer.

Therefore, sensitive adjustment in a conventional inertia braking system constitutes an unattainable aim because the alternating brake applications and brake releases produce very powerful shocks most likely to have detrimental effects without improving the braking action proper. To avoid these shocks, a solution has been proposed which consists in interposing a damper or shock absorber between the tow-bar and the trailer frame, but in this case serious drawbacks arise because on the one hand the braking action is limited and attains only insufficient values, and, on the other hand, the damper or shock absorber is subjected to abnormally high pressures likely to attain or even exceed a force corresponding to the weight of the trailer.

These drawbacks can be avoided by providing according to this invention an inertia brake adjuster characterized in that a moderator spring or any other adequate resilient device is interposed between the sliding tow-bar and the brake lever.

Thus, in a device constructed according to the teachings of this invention, the action exerted by the brake lever of the trailer is not controlled directly by the thrust of the sliding tow-bar; under the influence of the slightest deceleration, the tow-bar compresses a spring or any other elastic member or device connected directly to the brake lever. Thus, when the tow-bar has accomplished its maximum stroke, the force applied to the lever will not exceed the compression capacity of the spring or other elastic device.

In order to obtain a perfect regulation in the braking force the displacement of the brake lever is proportional to the stroke of a shock absorber of particular design; moreover, the shock-absorber avoids any premature brake application, thus eliminating any detrimental jerks and shocks; its operation is particularly efficient since it is, on the one hand, independent of the traction exerted on the tow-bar and, on the other hand, definitely protected against the application of a force greater than that transmitted through the moderator spring.

In a device of this character when the tractor vehicle decelerates the sliding movement of the tow-bar causes a compression of the moderator spring and as a consequence:

(1) The shock which would result from the movement of the vehicles toward each other is absorbed.

(2) The brakes are applied.

In fact, the force developed by the moderator spring during its compression is not lost, it is stored until the shock absorber releases it to the benefit of the braking system. Therefore, the time elapsing until this force is released, as well as the magnitude of this force, are proportional to the deceleration of the tractor vehicle. If the deceleration is moderate and of short duration, no brake application takes place; if it continues the braking action will be felt very moderately. If the deceleration is strong, the brake response will be of the order of a few tenths of a second, and no fierce shock will take place between the vehicles since the optimum brake application in the trailer will occur before the sliding device has completed its permissible stroke. Although a slight delay is introduced into the brake application, on the other hand the thrust which would be exerted by the trailer is eliminated just when its force becomes dangerous or at least detrimental.

In hitherto known inertia braking systems of the type comprising a direct coupling system between the tow-bar and the brake lever it is necessary to reduce the force applied to the braking system in order to avoid any failure in the brake elements not only by providing a damping spring but also by reducing the ratio of the brake lever arm which is usually reduced from ½ to 1/1.

On the contrary, in the arrangement proposed in this invention it is possible, due to the action exerted by the moderator spring and without any risk of detrimental consequences, to increase the lever force to the ratio of 2/1 to 3/1. Thus, given a same braking power it is possible to use regulating members that are subjected only to moderate stress. On the other hand, as the shock absorber counteracts any improper or untimely brake release the braking power may be increased without any inconvenience. However, the resistance set up by the shock absorber to the return movement of the brake lever is so calculated that the braking action decreases automatically before the wheels are locked.

This inertia braking device is also adapted to be associated with the continuous braking apparatus used notably in heavier trailers for regulating the braking force as a function of the trailer load.

With the foregoing and other obejcts in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

Other objects and advantages will become apparent from the following description taken in conjunction with the accompanying drawing in which:

FIG. 1 is a longitudinal section showing an inertia braking device constructed according to the teachings of this invention;

FIG. 2 is another longitudinal section showing a modified embodiment of the device of this invention;

FIG. 3 illustrates on a larger scale the mounting of the brake lever on this device, and FIG. 4 is a section view taken on the line IV—IV of FIGURE 3; and FIG. 5 is a perspective detail view of elements shown in FIG. 4.

The device illustrated comprises essentially a hollow tube or sleeve 1 having fitted in its front end the relevant end of the tow-bar 2 carrying or formed integrally with a coupling ring 3. The sleeve 1 has slidably fitted therein another tubular member 4 having its rear end pivotally connected to a brake lever 5.

The towing sleeve 1 is slidably mounted in turn in a casing 6 constituting the draw pole of the trailer is guided on the one hand by a bore 7a formed in the front end wall 7 of said casing 6 and, on the other hand, by a socket 8 formed with a threaded portion engaging a tapped opening 9 formed in the rear end wall 10 of the casing.

A collar 11 surrounds the sleeve 1 within the casing 6 and a screw 12 extends therethrough for assembling this sleeve 1 with the tow-bar 2, this collar 11 acting as an end abutment to a buffer spring 13 bearing with its other end against another collar 14 carried by the end of socket 8 which is screwed in the casing. The other end of this socket is preferably flanged and knurled to facilitate the screwing in or out thereof in the rear end wall 10 of the casing for adjusting the prestress applied to the spring 13.

A resilient ring 15 preferably of synthetic rubber such as neoprene is mounted in smooth frictional fit on the smooth outer wall of the tow-bar receiving sleeve 1, between the front end wall 7 of casing 6 and the collar 11.

A moderator spring 16 mounted inside the tubular member 4 and sleeve 1 bears with one end against the tow-bar 2 and with its rear end against the bottom of tubular member 4.

The rear end of this tubular member 4 is rigid with a block 17 pivotally connected to the rod 18 of the piston of a hydropneumatic shock absorber 19 attached to the trailer frame. The block 17 carries a pair of laterally extending pins 20 each engaging a slot 21 formed through the upper end of one of a pair of brake levers 5 fulcrumed at 22 on the trailer frame, the trailer brake control cable or rod 23 being attached to the lower end of these brake levers.

Under normal operating conditions the tractor vehicle exerts a traction on the sleeve 1 through the ring 3 and tow-bar proper 2, and the collar 11 compresses the rubber ring 15 against the front end wall 7 of casing 6.

When a deceleration of the tractor vehicle occurs, the trailer, due to its inertia, causes the sleeve 1 to slide in the direction of the arrow 24. The shock is absorbed by the buffer spring 13 and the moderator spring 16 is compressed simultaneously so as to cause the tubular member 4 to slide in the direction of the arrow 25 and the piston rod 18 to penetrate into the shock absorber 19.

The spring 16 is compressed more or less according to the magnitude of the deceleration, and its force will be applied to the brake lever as the piston of shock absorber 19 recedes into its cylinder.

The upper end of the brake lever 5 fulcrumed on the trailer frame will thus pivot to the rear so as to cause the lower end of lever 5 to pull the brake control cable or rod 23 in the direction of the arrow 26.

Should the trailer deceleration become suddenly greater than that of the tractor vehicle, the return movement of the tubular member 4 to its initial position would be retarded by the action of the shock absorber 19 since the latter is independent of the traction exerted on the towbar and sleeve assembly.

In FIGS. 2 to 4 of the drawings, a modified embodiment of the device of this invention is illustrated and the same reference numerals are applied as to the similar elements of the device shown in FIG. 1.

In this alternate embodiment the buffer spring 13 is replaced by a cylinder 13a of resilient material which is shorter than said spring 13 in its unstressed condition and mounted in smooth frictional engagement on the towsleeve 1; this elastic cylinder 13a is adapted to be compressed when the trailer is caused by its inertia to move toward the tractor vehicle, after a certain free stroke of the tow-sleeve 1 in the casing 6 between the collar 11 secured on said sleeve 1 and a ring 27 secured by screw 28 on the inner wall of the casing 6.

Secured on the front end of the casing 6 by means of screws 29 is a socket 30 adapted to guide the axial sliding movements of the sleeve 1 and formed with an annular groove 31 engageable by a split or like collar (not shown) for securing the casing 6 on the trailer pole. The rear portion 32 of the shock absorber 19 is anchored on the casing 6 and a washer 33 is fitted in smooth frictional engagement in the casing between the transverse anchoring pin 32 and the shock absorber for positioning the latter and avoiding any undue play during the operation of the device.

The casing 6 has formed through its wall, in the vicinity of the block 17, an opening 34 permitting the passage and movement of the two brake levers 5 fulcrumed respectively at 22 on two vertical parallel gusset plates 35 rigid with the casing 6.

The lower ends of these brake levers 5 are interconnected by a distance-piece 36 located in the bottom of a flat-iron member 37 bent to form an elongated U with the free ends of its sides shaped to constitute a strap 39 for anchoring at 40 the brake control cables (not shown).

The fulcrum pin 22 of levers 5 is so located that the ratio of the lever arm provided by each lever 5 is substantially equal to 3/1.

Pivoted on the front ends of the two gusset plates 35 are a pair of levers 41 having their upper ends interconnected by a handle 42 and their lower ends formed into straps 43 on which is anchored one end of a chain 44 having its other end attached to the towing vehicle, not shown. Mounted on the rear end of the U-shaped member 37 and attached thereto through a strap 39 is a coextensive, similar U-shaped member 45 of greater length of which the bent portion surrounds a cross-member 46 constituting a tie-rod between the two levers 41.

A lock pin 47 which, in the inoperative position, engages a pair of registering holes formed in the gusset plates 35, may be interposed in the path of the pair of brake levers 5 with a view to lock the device when the tractor vehicle is to be driven in reverse. In this case the lock pin 47 is threaded through another pair 48 of registering holes formed in the vicinity of, and at a higher level than, the fulcrum axis 22.

A pawl 49 is pivoted near the upper end of the pair of levers 41 and its tip 50 is adapted to drop by gravity into one of the notches of a rack 51 secured on the upper face of the casing 6.

In order to avoid the ingress of dust or other foreign substances into the device an elastic bellows 52 is secured externally of the casing 6 on the sleeve 1, between the tow ring 3 and the socket 30.

To prevent any air trapped and compressed in the annular chamber formed between the sleeve 1 and the bellows 52 from unseating this bellows, one or more orifices 53 are formed through the wall of said sleeve, in the region of its front end, and other orifices 54 are formed similarly in the vicinity of the rear end of the tube 4. During the operation of the device, the air contained in this chamber escapes through the orifices 53 into the sleeve 1 and tubular member 4 and then through the orifices 54 into the casing 6. These orifices may be calibrated, if desired, for throttling the air flow and provide an efficient damping effect in the operation of the device.

This device operates like the device described with reference with FIG. 1. The operative connection between the levers 5 and 41 through the U-shaped members 37 and 45 is such that the pivoting movement of levers 5 which results from a deceleration of the tractor vehicle will not change the position of levers 41. Similarly, the actuation of the hand brake levers 41 is not attended by that of the inertia brake levers 5, as each set of levers actuates the brake linkage separately. Thus, the levers 41 may be used as parking brake levers.

The chain 44 connecting the lower portion of said levers 41 to the tractor vehicle will apply the trailer brakes instantaneously in case of brakage of the coupling means between the tractor and the trailer.

Besides, it will be readily understood that many modifications and variations may be brought to the forms of embodiment shown and described herein, without departing from the spirit and scope of the invention; thus the device illustrated may be used as a brake adjuster in any type of automotive vehicles by utilizing the inertia of any suitable mass for its operation.

What I claim is:

1. An automatic device for applying the brakes of a trailer equipped with a braking system and with means for controlling said braking system and coupled to a tractor vehicle, said device comprising a cylindrical case secured on the front end of the trailer, a sleeve member secured on the front end of said cylindrical case to constitute a cylindrical inlet directed inwards of said cylindrical case, a ring secured in said cylindrical case and constituting a cylindrical passage therein, a coupling member comprising a front portion attached to said tractor and a tubular rear portion extending coaxially in said case so as to slide in said sleeve member and in the ring secured on said case, a collar secured on said coupling member and housed with clearance in said cylindrical case, a driving ring of resilient material slidably engaging the outer surface of said coupling member and enclosed in said cylindrical case between said sleeve member secured thereto and said collar solid with said coupling member, a bumper socket of resilient material slidably engaging the outer surface of said coupling member and enclosed in said cylindrical case between said collar solid with the coupling member and the ring secured in said cylindrical case, a moderator spring housed with radial play in the rear tubular portion of said coupling member, said spring having a front end bearing against the front portion of said coupling member and an operative rear end, a brake actuating member having a tubular front portion slidably engaging said tubular rear portion of said coupling member and surrounding the front end of said moderator spring, and a rear portion, a hydraulic shock-absorber secured in said cylindrical case behind said brake actuating member and connected to the rear portion of said brake actuating member, a pair of trunnions extending laterally from the rear portion of said brake actuating member, a pair of inertia control levers pivotally mounted on a transverse pin carried externally by said cylindrical case, said levers having driven ends and driving ends, the driven ends engaging said casing through an aperture formed therein and having the shape of forks engaging the trunnions of said rear portion brake actuating member, said driving ends being disposed externally of said casing, a bracing member rigidly interconnecting said driving ends, a two-armed loop engaging said bracing member and a yoke connecting the arms of said loop for positively operating said control means for actuating the wheel brakes of the trailer braking system.

2. An inertia brake adjuster as set forth in claim 1, comprising two inertia brake control levers having driven ends and driving ends, the ratio of said driven ends to said driving ends being greater than 1:1.

3. An inertia brake adjuster as set forth in claim 1, comprising two inertia brake control levers having driven ends and driving ends, the ratio of said driven ends to said driving ends being greater than 2:1.

4. An automatic device for actuating the braking system of a trailer as set forth in claim 1, comprising a hand control member operable by the driver of said trailer, notably for parking said trailer, which consists of another pair of levers, said other pair of levers being pivotally mounted on either side of said cylindrical case about a transverse pin extending externally of, and carried by, said case, said pin being parallel to and close to the axis of oscillation of said inertia brake levers, said other levers having driven ends, a driven bracing member rigidly interconnecting said driven ends and driving ends of said other levers, a driving bracing member rigidly interconnecting said driving ends of said other levers, and being parallel to and in close proximity of said driving bracing member of said inertia control levers, another two-armed loop having its arms engaged on said other driven bracing member, said other two arms being assembled by the same yoke as said two arms of said inertia brake loop, a rack mounted on said cylindrical case and a pawl carried by the driven ends of said other levers for engaging said rack and holding said levers against motion in their pre-selected position obtained by moving said driven bracing member in the braking direction.

5. An automatic device for actuating by inertia the braking system of a trailer as set forth in claim 4, which comprises, in addition, another bracing member interconnecting the driven ends of said braking lever and a chain connecting said other bracing member to the tractor vehicle for automatically actuating the brakes in case of breakage of the coupling between the trailer and the tractor vehicle.

6. An automatic device for actuating by inertia the braking system of a trailer coupled to a tractor vehicle as set forth in claim 5, which comprises a cross-pin adapted to be so positioned as to counteract the movement of the inertia braking lever while permitting the control of the braking system by the driver of the trailer by means of the other levers, as well as the braking of the trailer and tractor assembly.

7. An inertia brake adjuster for a trailer equipped with a braking system and coupled to a tractor vehicle, comprising a cylindrical casing secured at a front end of said trailer and having two circular ends, one at the front and the other at the rear, each end having an axial hole, a coupling rod comprising a front portion attached to the tractor vehicle in operation and a rear tubular portion extending through said front bottom of said casing and sliding coaxially therein, a collar secured on the rear tubular portion of said coupling rod and housed with radial clearance in said cylindrical casing, a resilient driving member slidably mounted about said coupling rod in said cylindrical casing between said collar and the front bottom of said casing, an elastic shock-absorbing element slidably mounted about the rear tubular portion of said coupling rod in said casing between said rear bottom and said collar, another rod having a tubular front portion slidably mounted in said rear tubular portion of said coupling rod, an elastic moderator member housed with radial clearance in said rear tubular portion of said coupling rod between the bottom of said tubular portion of said coupling rod and the bottom of the front tubular portion of said other rod, connecting members connecting said other tubular rod and the brake actuating lever of the braking system of the trailer, and a member disposed between said other tubular rod and said trailer for damping out the sliding movements of said other tubular rod in said coupling rod and which are caused by decelerations and accelerations of the tractor vehicle, the last-named member comprising a hydraulic shock-absorber having a cylinder and a piston one of which is fixed to said other tubular rod and the other with said trailer, said cylinder and piston assembly being disposed in axial alignment with said other tubular rod, an axially tapped ring housed in the rear portion of said cylindrical casing, a screw-threaded socket engaging said ring, a bore formed in said socket and adapted to be slidably engaged by the rear portion of said coupling rod, and the front end of said socket serving as a bearing face to the rear end of said elastic shock-absorbing element.

References Cited in the file of this patent

UNITED STATES PATENTS

| | | |
|---|---|---|
| 2,113,262 | Zagelmeyer | Apr. 5, 1938 |
| 2,138,267 | Christenson | Nov. 29, 1938 |
| 2,144,401 | Buckellew | Jan. 17, 1939 |

(Other references on following page)

UNITED STATES PATENTS

| | | |
|---|---|---|
| 2,166,452 | Therres | July 18, 1939 |
| 2,399,746 | Klaus | May 7, 1946 |
| 2,407,156 | Horne | Sept. 3, 1946 |
| 2,704,585 | Strömberg | Mar. 22, 1955 |
| 2,802,580 | Larsson | Aug. 13, 1957 |
| 2,834,436 | Davids | May 13, 1958 |
| 2,834,437 | Davids | May 13, 1958 |
| 2,936,048 | Love | May 10, 1960 |
| 3,026,975 | Yoder | Mar. 27, 1962 |
| 3,062,332 | Bailey | Nov. 6, 1962 |

FOREIGN PATENTS

| | | |
|---|---|---|
| 814,366 | France | Mar. 15, 1937 |
| 893,366 | France | Jan. 31, 1944 |
| 66,866 | Netherlands | Dec. 15, 1950 |